April 14, 1953  J. H. F. KENT  2,634,492
DEVICE FOR RETREADING TIRES
Filed March 9, 1948  7 Sheets-Sheet 2

April 14, 1953 J. H. F. KENT 2,634,492
DEVICE FOR RETREADING TIRES
Filed March 9, 1948 7 Sheets-Sheet 3

Inventor
Jan H. F. Kent
By his attorneys:
Baldwin, Wight & Brown

April 14, 1953 J. H. F. KENT 2,634,492
DEVICE FOR RETREADING TIRES
Filed March 9, 1948 7 Sheets-Sheet 4

April 14, 1953   J. H. F. KENT   2,634,492
DEVICE FOR RETREADING TIRES
Filed March 9, 1948   7 Sheets-Sheet 7

Patented Apr. 14, 1953

2,634,492

UNITED STATES PATENT OFFICE 2,634,492

DEVICE FOR RETREADING TIRES

Jan Herbert Farquharson Kent, Worting, Basingstoke, England, assignor of one-half to Auto Tyre Services Limited, Worting, Basingstoke, England, a company of Great Britain Application March 9, 1948, Serial No. 13,928
In Great Britain March 20, 1947

4 Claims. (Cl. 29—76)

This invention relates to improvements in tire rasping or buffing machines designed to modify the tread of the tire, which hereinafter is referred to as detreading.

In the process of retreading tires, it is necessary before applying the new (unvulcanized) tread rubber to rasp the tread surface of the worn tire, firstly in order to remove inequalities and secondly to leave a roughened surface for the new tread to adhere to.

In doing this work on a production basis, difficulties arise by reason of the many different sizes of tires and varying curvatures in the types of tire sections encountered, necessitating either a number of curved rasps, which have to be changed to suit each individual tire, or the taking of a number of cuts at different angles using a straight rasp.

This invention has for its object to provide an improved detreading machine which will enable the tread of the tire to be shaped to any desired section by a single cutting operation, once the tire carcass has been set up in the machine.

A further object of the invention is to provide a detreading machine in which the detreading operation, once the machine has been started up, becomes more or less automatic in that it is under the control of a single lever which sets the depth or amount of cut.

Broadly stated, the present invention consists in combining with the rasping machine, a device adapted by engagement with the beads or walls of the tire to separate them and thus modify the contour of the tread, such as by flattening it, so that while it is subjected to the action of the rasp, it possesses the same or substantially the same cross section as the rasp itself, regardless of the original transverse radius of the tread.

In this manner it is possible to reduce the cross section of the tread to a plane or concave surface, or to whatever other contour is required; this makes it possible to use the same rasp or brush irrespective of the size of the tire or curvature thereof undergoing repair. On release of the pressure on the beads after rasping, the tire will assume its normal curvature again. The device of this invention thus overcomes the necessity of changing contour rasps, or taking a number of individual cuts at different angles on a straight rasp.

According to this invention a machine for modifying, by cutting, the tread of a tire comprises means for supporting the tire to revolve about its centre, means for applying pressure to the walls of the tire to force them apart to produce a flattening at the tread, said means being movable into and out of engagement with the tire, and cutting means adapted to make a cut on the tread when in a flat or similar condition by causing the tire to be moved past the cutting means.

Apparatus for carrying out the invention comprises a main frame, a set of rollers to support the tire so as to be capable of revolving about its centre, a subassembly mounted on the main frame movable to and from a position centrally within the centre of the tire, and finger elements carried by the subassembly and adapted when said assembly is in position to engage with the tire to force the beads apart to produce a flattening at the tread, and cutting means movable into and out of engagement with the tread to apply the desired cut thereto when flattened.

In order to center the tire in relation to the rollers, means, such as levers, may be provided movable into and out of engagement with the side walls of the tire so as to shift the tire bodily to a central position. Other means, preferably opposite pairs of rollers, may be provided to maintain the tire positioned in a vertical plane in relation to the support rollers. These guide rollers may be movable to and from a central position where they are positively held so as to engage the tire at a point on its circumference opposite to the support rollers, and are so constructed and arranged that when withdrawn they do not interfere with the placing of a tire in position on the support rollers.

The invention is illustrated in the accompanying drawings in which.

Figure 3:
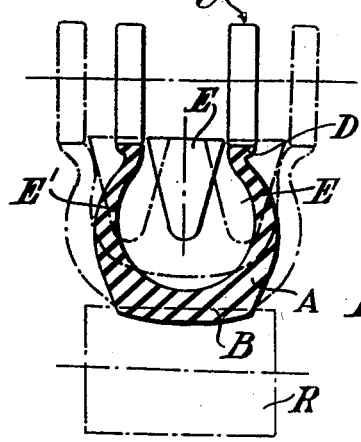
Figure 3 is a diagrammatic view showing the tire in cross section with the finger elements in position before and after displacement of the beads.

Referring to Figure 3 of the drawings, A indicates a tire shown in cross section, the tread B of which is to be subjected to the action of a rasp to remove inequalities and to provide a roughened surface to facilitate adhesion of the new tread to be built up thereon.

The method of this invention essentially consists in spinning the tire circumferentially during such time as the tire is held by a series of rollers to prevent movement of the tire laterally, including a vertical set of rollers indicated diagrammatically at C and while its beads D are spread apart by means of tire distending mechanism incorporating pressure applying finger elements E, E'. When in this position a cutting tool e. g. a rasp indicated at R, is brought into engagement with the tread, the surface of which will now be substantially flat, the rasp rotating about an axis in a plane parallel to the axis of rotation of the tire.

Figure 1:
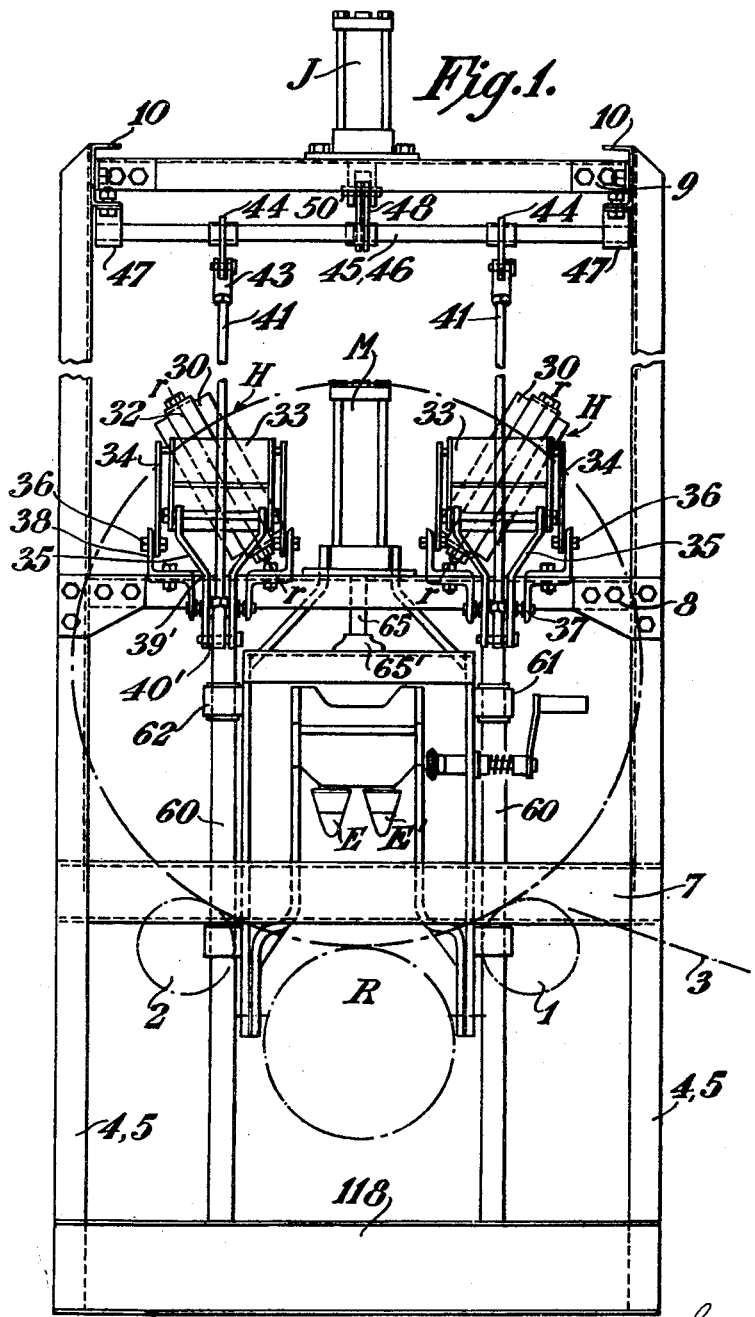
Figure 1 is a side view of the machine constructed according to the invention showing a tire (in dotted lines) in position.
Figure 2:
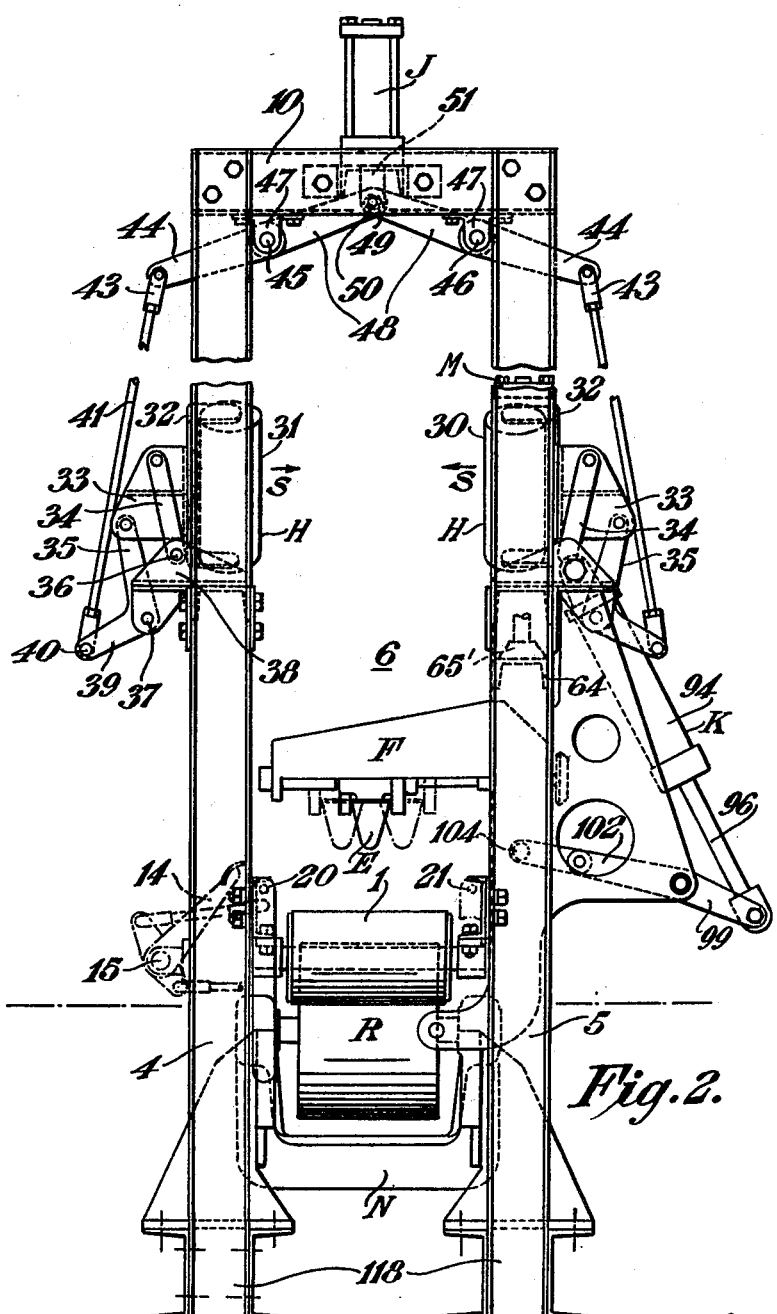
Figure 2 is an end view corresponding to Figure 1 with the finger elements for moving the beads apart in their operative position.

A machine capable of performing the rasping operation and centering the tire on its supporting rollers is shown in Figures 1 and 2. The machine comprises essentially a subframe F, under the control of a cylinder K, supporting the finger elements E, the whole frame being withdrawn so that a tire to be processed can be rolled or otherwise placed in position, shown in dotted lines in Figure 1, where it rests on rollers 1, 2. When in position on rollers 1, 2, the tire is centered and held laterally by two opposite sets of rollers, indicated generally at H, under the control of a ram J, the ram J remaining operative during the rasping operation so that the tire is centered and held vertically in relation to the face of the rasp R.

The next step in the operation, assuming the tire has been centered by rollers H, is for the subframe F, through a second ram M, to be moved into position within the center of the tire so that the finger elements E, E' (see Figure 2) are in alignment with the opening between the beads D of the side walls of the tire. Having been so positioned, this frame is now lowered and when in position, as shown in Figure 3, the two finger elements E—E' are moved apart from one another to the dotted line position shown, thereby forcing the beads apart and so causing a flattening of the tire at the tread. The rasp R which is carried by another subunit N (see Figure 2) is now lifted to contact the tread of the tire.

It will be appreciated that the rasp is raised until the requisite cut on the tire is obtained after which the rollers 1, 2 which are separately connected to a small horsepower motor (not shown) are rotated until the tire has done a complete revolution past the rasp. The operations just described are now repeated in reverse sequence and the tire pushed off the roller 2 ready for the next tire.

The machine shown in Figures 1 and 2 comprises a vertical cage having pairs of uprights 4, 5 spaced apart from one another to provide a central passage 6, into which the tire can be wheeled up a ramp 3 and in to position on the support rollers 1, 2 which are now stationary. The uprights 4, 4, 5, 5, are connected by laterals 7, 8, 9 and are spaced apart from one another at their upper end by transverse straps 10.

Figure 4:
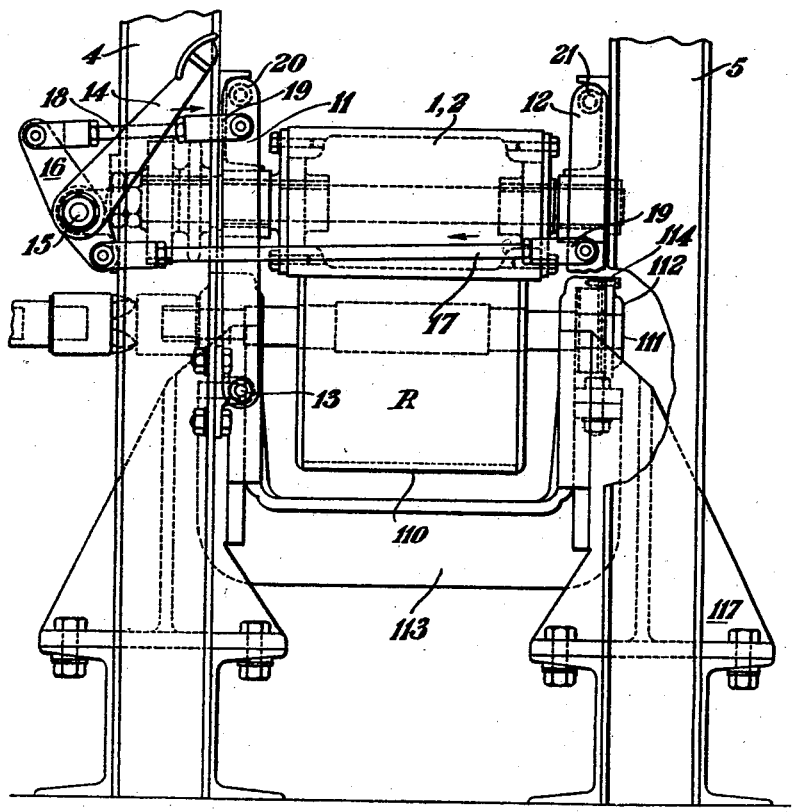
Figure 4 is an enlarged view of the lower part of Figure 2 showing the tire supporting and revolving rollers in detail.

To assist in centering a tire, which has been positioned on the rollers 1, 2, there are preferably provided two opposite pairs of lever arms 11—11 and 12—12 (see Figure 4) mounted to rock about lateral horizontal axes 13 provided in brackets attached to each pair of uprights 4, 5. Movement of the lever arms 11, 12 is controlled by a foot pedal 14 fast on an axis 15 to which is also secured a two armed lever 16 connected to the opposite ends of which are rods 17, 18 coupled through straps 19 to one of each of the lever arms 11, 12. Pressure on the foot pedal 14 will rock the lever 16 thereby displacing the upper ends of arms 11, 12, in the direction of the arrows with the object of centering the lower portion of the circumference of the tire in relation to the rollers 1, 2. Each pair of arms 11, 12 is interconnected by means of rods 20, 21 so as to engage the lower circumference of the tire across a chord and thus properly center it in relation to the rollers 1, 2.

The operation and actuation of the rollers H which are arranged in two oppositely acting pairs 30—30 and 31—31 can best be seen in Figures 1 and 2. Each roller is mounted to rotate about an inclined axis r—r radial to the center of rotation of the tire, being freely mounted to revolve between U-shaped brackets 32 rigid with displaceable supports 33. The brackets 33 are displaceable laterally from the open or withdrawn position shown in Figure 2 in the direction of the arrows S corresponding to the movement of the centering rods 20, 21 so as to co-operate therewith in centering the tire but whereas the rods 20, 21 are withdrawn once the tire is centered i. e. during the rasping operation, the rollers 30, 31 remain locked in position to hold the tire in a vertical plane. Each of the four brackets 33 is supported by means of a parallel link motion including a link 34 and a lever 35 attached at their lower ends 36, 37 to angle brackets indicated generally at 38 carried on the laterals 8. The links 34 operate as a simple link but the lever arms 35 form one arm of a bell crank lever 39, whose other arm is connected at 40 to an actuating rod 41. It will be noted that the bell cranks 39 are bent in as at 39' and are connected to one another by a pin 40', on which the lower end of the actuating rod 41 is journalled.

The upper ends of the actuating rods 41, 42 are provided with straps 43 for connection to short armed levers 44 fast on rock shafts 45, 46. Each of the shafts 45, 46 are journalled to rotate in bearing housings 47 attached to the transverse members 10. Centrally connected to the shafts 45, 46 are levers 48 whose upper ends 49 are secured by means of a pin 50 to the piston 51 of the actuating ram J.

It will be obvious that on admitting fluid pressure to the cylinder of ram J, the rod 51 will move downwardly and thereby rock the shafts 45, 46 so transmitting motion through lever arms 44 to the links 41 and thence to the bell crank arms 35 which will displace the brackets 33 inwardly in the direction of the arrows S so that the rollers 30, 31 thereon will press against the side walls of the tire.

Figure 8:
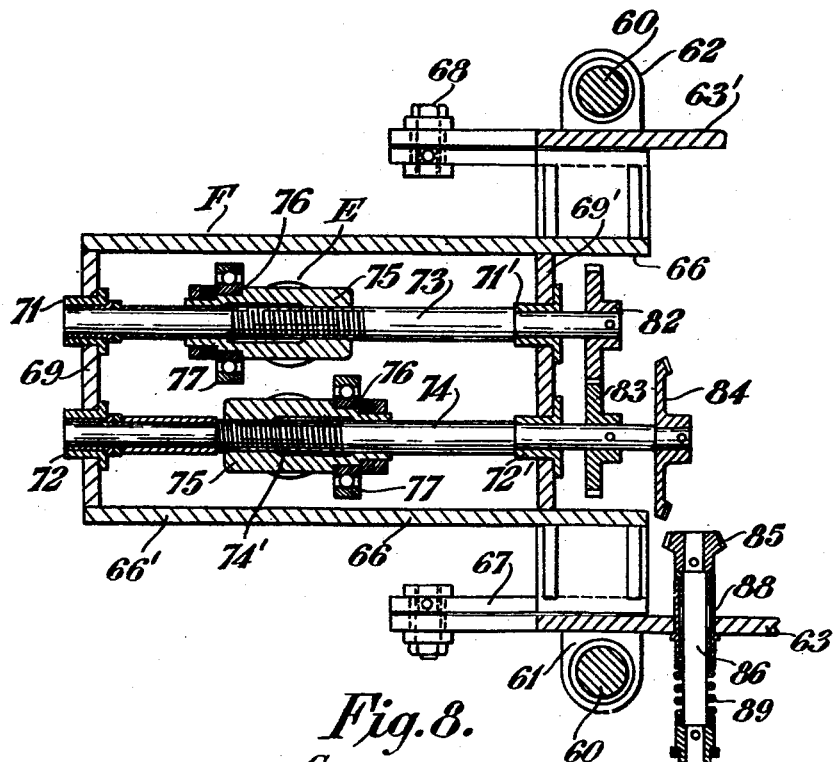
Figures 7 and 8 are respectively a vertical section and sectional plan view of the tire distending mechanism of Figure 6 and its method of operation.
Figure 6:
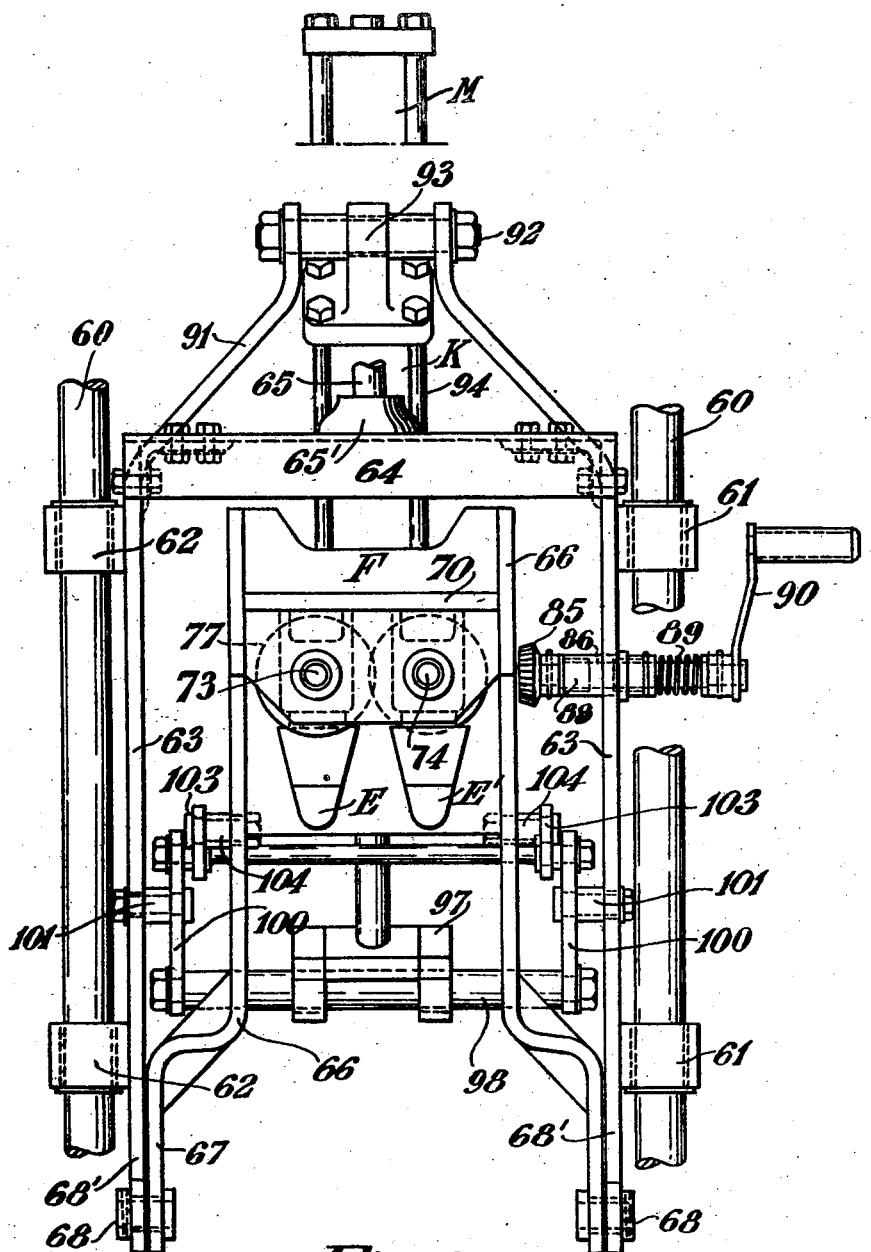
Figure 6 is an enlarged view of the middle part of Figure 1 showing the subframe supporting the finger elements forming part of the tire distending mechanism.
Figure 7:
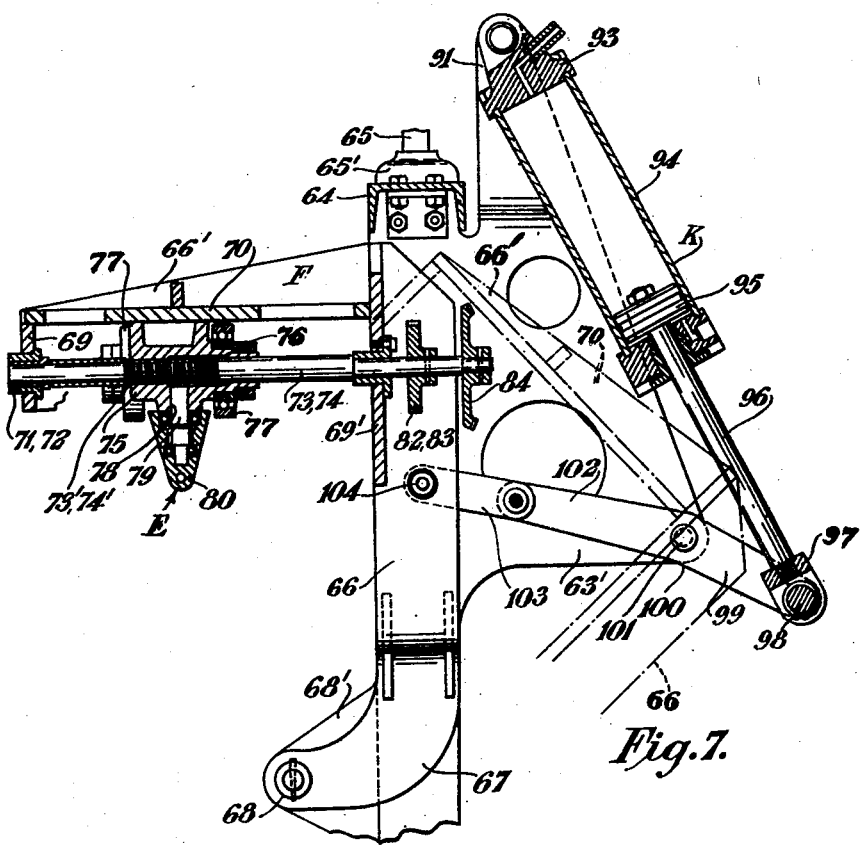

Referring now more particularly to Figures 6, 7 and 8 there is shown in detail the subframe F including the spreader finger elements E, E' for engaging and separating the side walls of the tire as already described in connection with Figure 3. Secured to the lateral members 7 and 8 are two vertical columns 60 on which are slidable pairs of collars 61, 62, these collars as is clearly shown in Figure 6 being integral with side plates 63 which are connected by an inverted channel 64. Vertical movement of the subframe is controlled by means of the hydraulic ram M (see Figure 1), which is mounted on the lateral 8, the piston rod having an extension 65 by means of which it is coupled to an anchorage 65' on the channel piece 64. Thus the subframe supporting the finger elements E, E' can be lowered into position when centrally above the opening between the beads. Mounted between the side plates 63 of the subframe is a swinging carriage comprising two underslung arms 66 having laterally offset lower ends 67, pivotally attached by means of studs 68 to lugs 68' on the side plate 63. Extending at right angles to arms 66, and when the latter are in their operative position (see Figure 7) inwardly of the main frame are limbs 66' which are joined at their outer ends by a brace plate 69, the arms 66 being spaced by a corresponding brace plate 69'. Supported by limbs 66' is a platform 70, the underside of which forms a thrust surface as hereinafter described. Journalled in bearings 71, 71', 72, 72' in the plates 69, 69' are spindles 73, 74 which are provided with screw threads 73', 74' over a portion of their length. Mounted on spindles 73, 74 are hub blocks 75, each of which blocks 75 is formed with a shoulder 76 for mounting a roller 77, the rollers as clearly shown in Figure 3 operating to engage the inner perimeters of the beads of the tire. The bore of each block is also screwed to engage the screwed portions 73', 74' of the spindles, so that rotation of the latter will cause the blocks to be traversed lengthwise of their respective spindles, each block being held against rotation by engagement with the underside of platform 70.

On the underside of the hub blocks 75 are drilled holes 78 to receive studs 79 each stud mounting by means of ball bearings a conical roller 80, the rollers 80 functioning as finger elements for engagement with the tire beads as illustrated by Figure 3.

It will be seen in Figure 8 that the spindles 73, 74 are extended beyond the plate member 69' and coupled to each other by intermeshing toothed wheels 82, 83 so that they will revolve in opposite directions, one of the spindles 74 being provided with a bevel pinion 84. Normally disengaged with the bevel pinion 84 is a smaller bevel 85 fast on a shaft 86, which shaft 86 is slidably and rotatably mounted in a sleeve member 88 carried by the right-hand side plate 63. The shaft 86 is normally held by means of a spring 89 in a position where the bevel 85 is out of engagement with pinion 84, a crank handle 90 being mounted on its outer end so the shaft can be forced inwardly against the action of spring 89 to bring bevel pinions 84, 85 into driving engagement with one another. It will thus be seen that pinions 84, 85 operate both as a clutch and means of imparting drive to the spindles 73, 74. When this takes place, by reason of the fact that the spindles are coupled for opposite rotation the blocks 75 will be moved in opposite directions from the position shown in Figures 7 and 8 where they are in alignment with one another to that shown in dotted lines (see Figures 2 and 3).

The side plates 63 as clearly shown in Figure 7 comprise outwardly extending portions 63' which at their upper ends are bent inwardly to form bracket arms 91 connected by a strap 92. The strap 92 functions as a trunnion for a mounting 93 for a hydraulic cylinder 94 having a ram 95 for swinging the carriage 67—70—80 into and out of a position centrally of the tire.

The piston 95, for this purpose has its piston rod 96 connected by a stirrup piece 97 to a cross bar 98 secured at its outer ends to the arms 99 of a pair of bell crank levers 100. The bell crank levers 100 are mounted on trunnion pins 101 in the extensions 63' of the side plates 63, their other arms 102 being connected through links 103 to studs 104 on the arms 66 which form part of the swinging carriage carrying the elements E.

In operation therefore, when the upper sets of rollers H have been moved into position to engage a tire, fluid pressure is admitted to the cylinder 94 so as to displace the piston 95 and swing the arms 67 from their outwardly inclined position (shown in dotted lines in Figure 7) to the vertical position where the limbs 66' with the platform 70 extending horizontally above the tire cavity, (as in Figure 7).

The next operation is to lower the subframe comprising the plates 63 and collars 62 downwardly on the columns 60 by means of the ram M so that the rollers 80 enter the interior of the tire D as shown in Figure 3.

Figure 5:
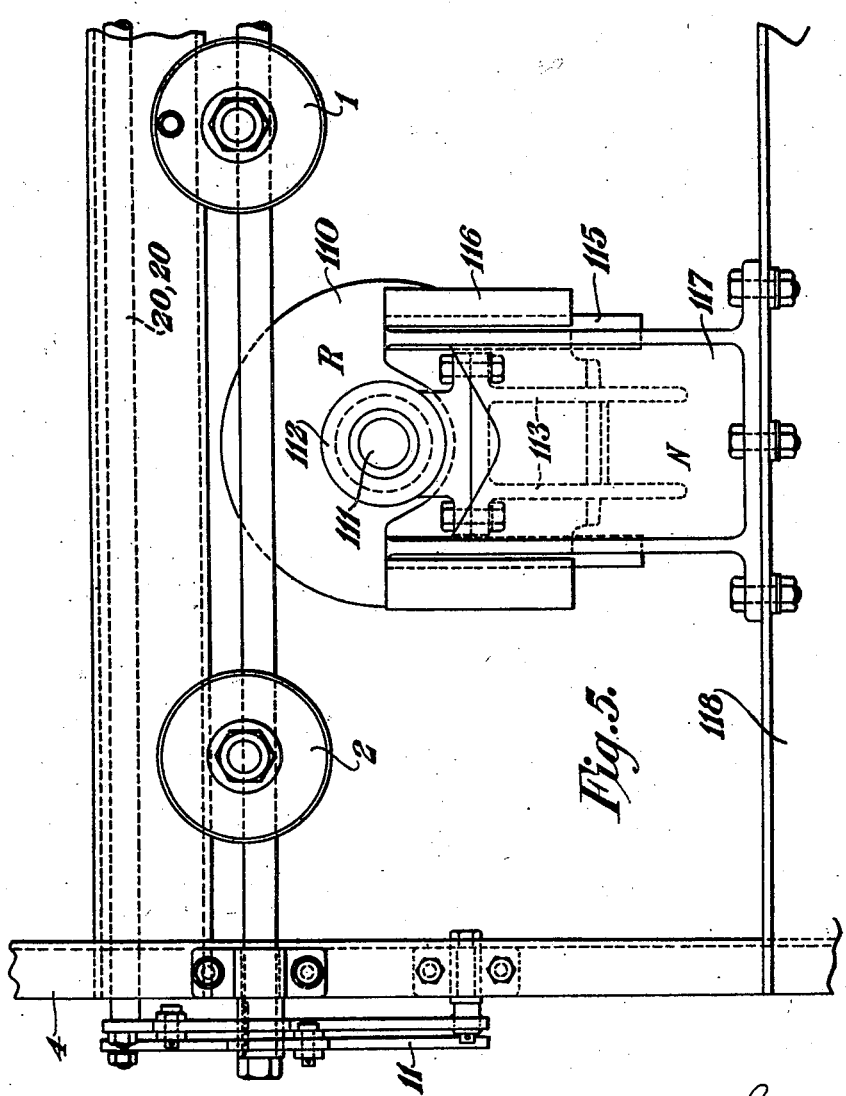
Figure 5 is a side view corresponding to Figure 4.

The cutting tool R (see Figure 5) preferably comprises a rotary wheel 110 having blades or teeth mounted to revolve on a spindle 111 supported at its ends in bearings 112 formed in the side arms 114 of a saddle member 113. On the side arms 114 are flats 115 for engagement with vertical bearing faces 116 machined in upstanding brackets 117 attached to the base 118 supporting the uprights 4, 5.

As previously described the rasp 110 is movable into and out of engagement with the tread of the tire by means of a screw jack, not shown, so that the requisite amount of cut can be made on the tread, the tire being caused to revolve by means of rollers 1 and 2.

It will be understood that the various operations of the machine may be controlled automatically and for this purpose the several ram or other power actuated means for raising and lowering the subframe, actuating the swing assembly thereon, controlling and locking centralizing rollers 30, actuating centralizing levers 20, imparting displacement to rasp R, starting and stopping the drive to the support rollers, 1, 2 and/or to rasp R may be intercoupled and controlled through a single control mechanism or valve so that the machine becomes fully automatic. The movement of the finger element EE' may also be carried out by power instead of the manual means shown.

What I claim is:

1. In apparatus for modifying by cutting the tread of a tire, a main frame having uprights providing an interior opening, at least two rollers on said frame adjacent the base of said opening to support a tire within the opening so as to be capable of revolving about its own center by power applied to the tire tread through one of said rollers, guide rollers supported by the frame so as to be capable of movement into and out of engagement with opposite sides of the tire, which rollers are normally positioned so as to permit unrestricted entry of a tire to the tire opening, a subframe supported by said main frame, said subframe having a carriage, said carriage comprising a pair of spaced arms pivotally mounted on the subframe and a platform joining and being carried by said arms, a pair of parallel spindles mounted on said carriage, finger elements, non-rotatable blocks carrying said finger elements and being traversible on said spindles, the pivotal mounting of said arms enabling movement of said subframe to and from a relatively stationary position overlying the inner perimeter of the tire, said finger elements being operative in the latter position to spread the tire at its opening through revolving of the tire relatively thereto, said finger elements being relatively fixed in the operative position so as to be capable of relative displacement, and means for moving the subframe to and from a position with the finger elements between the beads of the tire.

2. In apparatus for modifying by cutting the tread of a tire, a main frame having uprights providing an interior opening, at least two rollers on said frame adjacent the base of said opening to support a tire within the opening so as to be capable of revolving about its own center by power applied to the tire tread through one of said rollers, guide rollers supported by the frame so as to be capable of movement into and out of engagement with opposite sides of the tire, which rollers are normally positioned so as to permit unrestricted entry of a tire to the tire opening, a subframe supported by said main frame, said subframe having a carriage, said carriage comprising a pair of spaced arms pivotally mounted on the subframe and a platform joining and being carried by said arms, a pair of parellel spindles mounted on said carriage, finger elements, non-rotatable blocks carrying said finger elements and being traversible on said spindles, said non-rotatable blocks engaging said platform to prevent their rotation, studs on said blocks, said finger elements being in the form of conical rollers mounted on said studs, the pivotal mounting of said arms enabling movement of said subframe to and from a relatively stationary position overlying the inner perimeter of the tire, said finger elements being operative in the latter position to spread the tire at its opening through revolving of the tire relatively thereto, said finger elements being relatively fixed in the operative position so as to be capable of relative displacement, and means for moving the subframe to and from a position with the finger elements between the beads of the tire.

3. In apparatus for modifying by cutting the tread of a tire, a main frame having uprights providing an interior opening, at least two rollers on said frame adjacent the base of said opening to support a tire within the opening so as to be capable of revolving about its own center by power applied to the tire tread through one of said rollers, guide rollers supported by the frame so as to be capable of movement into and out of engagement with opposite sides of the tire, which rollers are normally positioned so as to permit unrestricted entry of a tire to the tire opening, a subframe supported by said main frame, said subframe having a carriage, said carriage comprising a pair of spaced arms pivotally mounted on the subframe and a platform joining and being carried by said arms, a pair of parallel threaded spindles mounted on said platform, finger elements, blocks carrying said finger elements having threaded engagement with said spindles and being traversible by rotation of said spindles, said blocks engaging said platform to prevent turning of the blocks, the pivotal mounting of said arms enabling movement of said subframe to and from a relatively stationary position overlying the inner perimeter of the tire, said finger elements being operative in the latter position to spread the tire at its opening through revolving of the tire relatively thereto, said finger elements being relatively fixed in the operative position so as to be capable of relative displacement, and means for moving the subframe to and from a position with the finger elements between the beads of the tire.

4. In apparatus for modifying by cutting the tread of a tire, a main frame having uprights providing an interior opening, at least two rollers on said frame adjacent the base of said opening to support a tire within the opening so as to be capable of revolving about its own center by power applied to the tire tread through one of said rollers, guide rollers supported by the frame so as to be capable of movement into and out of engagement with opposite sides of the tire, which rollers are normally positioned so as to permit unrestricted entry of a tire to the tire opening, a subframe supported by said main frame, said subframe having a carriage, said carriage comprising a pair of spaced arms pivotally mounted on the subframe and a platform joining and being carried by said arms, a pair of parallel threaded spindles mounted on said platform, finger elements, non-rotatable sliding blocks on which said finger elements are mounted having threaded engagement with said spindles and being traversible by rotation of said spindles, means coupling said spindles to rotate in unison, operating means normally disconnected from said spindles but being connectable therewith for rotating the spindles, the pivotal mounting of said arms enabling movement of said subframe to and from a relatively stationary position overlying the inner perimeter of the tire, said finger elements being operative in the latter position to spread the tire at its opening through revolving of the tire relatively thereto, said finger elements being relatively fixed in the operative position so as to be capable of relative displacement, and means for moving the subframe to and from a position with the finger elements between the beads of the tire.

JAN HERBERT FARQUHARSON KENT.

References Cited in the file of this patent
UNITED STATES PATENTS

| Number | Name | Date |
| --- | --- | --- |
| 1,426,910 | Replogle | Aug. 22, 1922 |
| 1,517,278 | Case | Dec. 2, 1924 |
| 1,713,488 | Grundmark | May 14, 1929 |
| 1,745,021 | Liebau | Jan. 28, 1930 |
| 1,863,764 | Prentice | Jan. 21, 1932 |
| 1,886,834 | Prentice et al. | Nov. 8, 1932 |
| 1,916,258 | Errig et al. | July 4, 1933 |
| 2,105,316 | Fleming | Jan. 11, 1938 |
| 2,173,795 | Fisher | Sept. 19, 1939 |
| 2,254,526 | Hawkinson | Sept. 7, 1941 |
| 2,321,936 | Pollock | June 15, 1943 |